(12) United States Patent
Ikarashi et al.

(10) Patent No.: US 11,480,991 B2
(45) Date of Patent: Oct. 25, 2022

(54) SECRET TABLE REFERENCE SYSTEM, METHOD, SECRET CALCULATION APPARATUS AND PROGRAM

(71) Applicant: NIPPON TELEGRAPH AND TELEPHONE CORPORATION, Tokyo (JP)

(72) Inventors: Dai Ikarashi, Musashino (JP); Koki Hamada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 128 days.

(21) Appl. No.: 16/977,954

(22) PCT Filed: Mar. 11, 2019

(86) PCT No.: PCT/JP2019/009596
§ 371 (c)(1),
(2) Date: Sep. 3, 2020

(87) PCT Pub. No.: WO2019/176831
PCT Pub. Date: Sep. 19, 2019

(65) Prior Publication Data
US 2021/0041906 A1    Feb. 11, 2021

(30) Foreign Application Priority Data
Mar. 12, 2018 (JP) .............................. JP2018-043855

(51) Int. Cl.
*G06F 1/03* (2006.01)
*G06F 7/24* (2006.01)
(Continued)

(52) U.S. Cl.
CPC ................ *G06F 1/03* (2013.01); *G06F 7/24* (2013.01); *G06F 7/76* (2013.01); *G06F 17/16* (2013.01)

(58) Field of Classification Search
CPC ..... G06F 1/03; G06F 7/24; G06F 7/76; G06F 17/16; H04L 9/085; H04L 9/008; H04L 2209/46
(Continued)

(56) References Cited

U.S. PATENT DOCUMENTS 9,906,360 B2 * 2/2018 Johnson ................ H04L 9/0631

OTHER PUBLICATIONS

Peeter Laud, "Efficient Oblivious Parallel Array Reads and Writes for Secure Multiparty Computation" IACR, International Association for Cryptologic Research, XP61016780, Aug. 16, 2014, pp. 1-6.
Peeter Laud, et al., "A Private Lookup Protocol with Low Online Complexity for Secure Multiparty Computation" ICIAP, International Conference on Image Analysis and Processing, XP47317465, 2015, pp. 143-157.
(Continued)

*Primary Examiner* — Tan V Mai
(74) *Attorney, Agent, or Firm* — Oblon, McClelland, Maier & Neustadt, L.L.P.

(57) ABSTRACT

A secure table reference system includes a first combining part $11_n$ for generating [v'] of v' ∈ $F^{m+nt}$ in which d and v are combined, a difference calculation part $12_n$ for generating [r"] of r" that has a difference between a certain element of r and an element before the certain element as an element corresponding to the certain element, a second combining part $13_n$ for generating [r'] of r' ∈ $F^{m+nt}$ in which r" and an m-dimensional zero are combined, a permutation calculation part $14_n$ for generating {{σ}} of a permutation σ that stably sorts v' in ascending order, a permutation application part $15_n$ for generating [s] of s: =σ(r') obtained by applying the permutation σ to r', a vector generation part $16_n$ for generating [s'] of a prefix-sum s' of s, an inverse permutation application part for generating [s"] of s" obtained by applying an inverse permutation $σ^{-1}$ of the permutation σ to s',
(Continued)

SECURE TABLE REFERENCE SYSTEM and an output part $17_n$ for generating [x] of $x \in F^m$ consisting of $(n_t+1)$th and subsequent elements of s".

4 Claims, 3 Drawing Sheets

(51) Int. Cl.
    *G06F 7/76*     (2006.01)
    *G06F 17/16*     (2006.01)

(58) Field of Classification Search
    USPC ......................................................... 708/200
    See application file for complete search history.

(56) References Cited

OTHER PUBLICATIONS

International Search Report dated May 21, 2019 in PCT/JP2019/009596 filed on Mar. 11, 2019, 1 page.

Hamada, K. et al., "Improved batch mapping algorithm for secure multi-party computation," SCIS 2014, Jan. 2014, pp. 1-6, 7 total pages (with English abstract).

Ikarashi, D. et al., "An Improvement of Secure Sorting toward 1 sec. Response on Internet," SCIS 2014, Jan. 2014, pp. 1-8, 9 total pages (with English abstract).

Kiribuchi, N. et al.,"An Efficient Equi-join Algorithm for Secure Computation and Its Implementation toward Secure Comprehensive Analyses of Users' Attribute and History Information," Computer Security Symposium 2016, Oct. 2016, pp. 1072-1078 (with English Abstract).

\* cited by examiner

SECRET TABLE REFERENCE SYSTEM, METHOD, SECRET CALCULATION APPARATUS AND PROGRAM

TECHNICAL FIELD

The present invention relates to a secure computation technique, and in particular, to a technique for referring to a lookup table while maintaining secrecy.

BACKGROUND ART

As the technique for referring to a lookup table while maintaining secrecy, a technique described in Non-patent literature 1 is known.

PRIOR ART LITERATURE

Non-Patent Literature

Non-patent literature 1: Koki Hamada, Dai Ikarashi, and Koji Chida, "Improved batch mapping algorithm for secure multi-party computation," 2014 Symposium on Cryptography and Information Security

SUMMARY OF THE INVENTION

Problems to be Solved by the Invention

However, in the technique described in Non-patent literature 1, communication volume is relatively large.

An object of the present invention is to provide a secure table reference system, method, secure computation apparatus, and program in which communication volume is smaller than the prior technique.

Means to Solve the Problems

A secure table reference system according to one aspect of the present invention is a secure table reference system comprising a plurality of secure computation apparatuses, wherein assuming that F denotes an arbitrary field, m denotes an integer greater than or equal to 2, $n_t$ denotes an integer greater than or equal to 1, [α] denotes a share where α is securely shared supposing α to be an arbitrary vector, {{β}} denotes a share where β is securely shared supposing β to be an arbitrary permutation, v denotes an m-dimensional vector $v \in F^m$, d denotes a vector $d \in F^{nt}$ consisting of elements of a set of input values of a prescribed lookup table, and r denotes a vector consisting of elements of a set of output values of the lookup table, wherein the plurality of secure computation apparatuses include a plurality of first combining parts for generating a share [v'] of a vector $v' \in F^{m+nt}$ in which the vector d and the vector v are combined using a share [d] of the vector d and a share [v] of the vector v, a plurality of difference calculation parts for generating a share [r"] of a vector r" that has a difference between a certain element of the vector r and an element before the certain element as an element corresponding to the certain element using a share [r] of the vector r, a plurality of second combining parts for generating a share [r'] of a vector $r' \in F^{m+nt}$ in which the vector r" and an m-dimensional zero vector are combined using the share [r"], a plurality of permutation calculation parts for generating a share {{σ}} of a permutation σ that stably sorts the vector v' in ascending order using the share [v'], a plurality of permutation application parts for generating a share [s] of a vector s: =σ(r') obtained by applying the permutation σ to the vector r' using the share [r'] and the share {{σ}}, a plurality of vector generation parts for generating a share [s'] of a vector s' that has a total sum from a first element of the vector s to a certain element as an element corresponding to the certain element using the share [s], a plurality of inverse permutation application parts for generating a share [s"] of a vector s" obtained by applying an inverse permutation $σ^{-1}$ of the permutation σ to the vector s' using the share [s'] and the share {{σ}}, and a plurality of output parts for generating a share [x] of a vector $x \in F^m$ consisting of $(n_t+1)$th and subsequent elements of the vector s" using the share [s"].

Effects of the Invention

According to the invention, it is possible to make communication volume smaller than the prior technique.

DETAILED DESCRIPTION OF THE EMBODIMENTS

Figure 1:
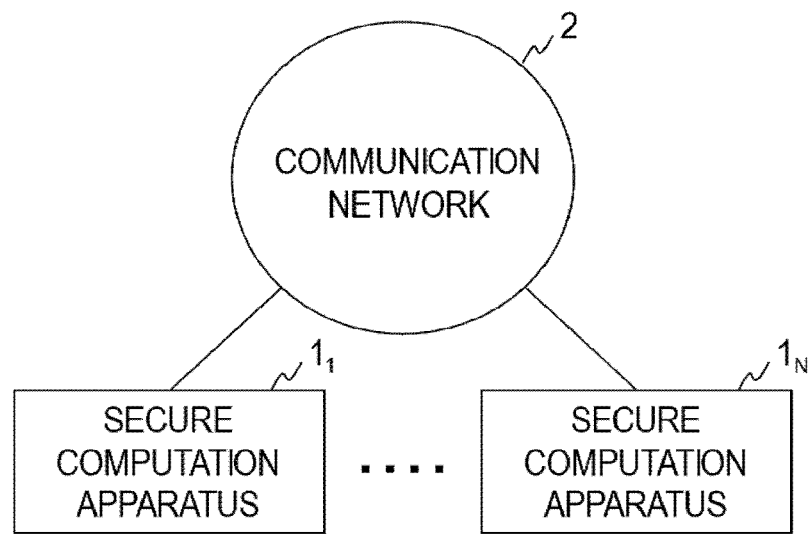
FIG. 1 is a diagram exemplifying a functional configuration of a secure table reference system.

Hereinafter, an embodiment of the present invention will be described in detail. Note that component parts having the same functions in the drawings will be denoted by the same reference numerals, and redundant description will be omitted.

A configuration example of a secure table reference system of the embodiment will be described with reference to FIG. 1. The secure table reference system includes N (≥2) secure computation apparatuses $1_1, \ldots, 1_N$. In the embodiment, the secure computation apparatuses $1_1, \ldots, 1_N$ are each connected to a communication network 2. The communication network 2 is a circuit switching or packet switching communication network configured so that each apparatus connected can communicate with each other, such as the Internet, a LAN (Local Area Network), and a WAN (Wide Area Network). Note that each apparatus does not necessarily need to be able to communicate online via the communication network 2. For example, information to be input into the secure computation apparatuses $1_1, \ldots, 1_N$ may be stored in a portable recording medium such as a magnetic tape or a USB memory and then input offline from the portable recording medium into the secure computation apparatuses $1_1, \ldots, 1_N$.

Figure 2:
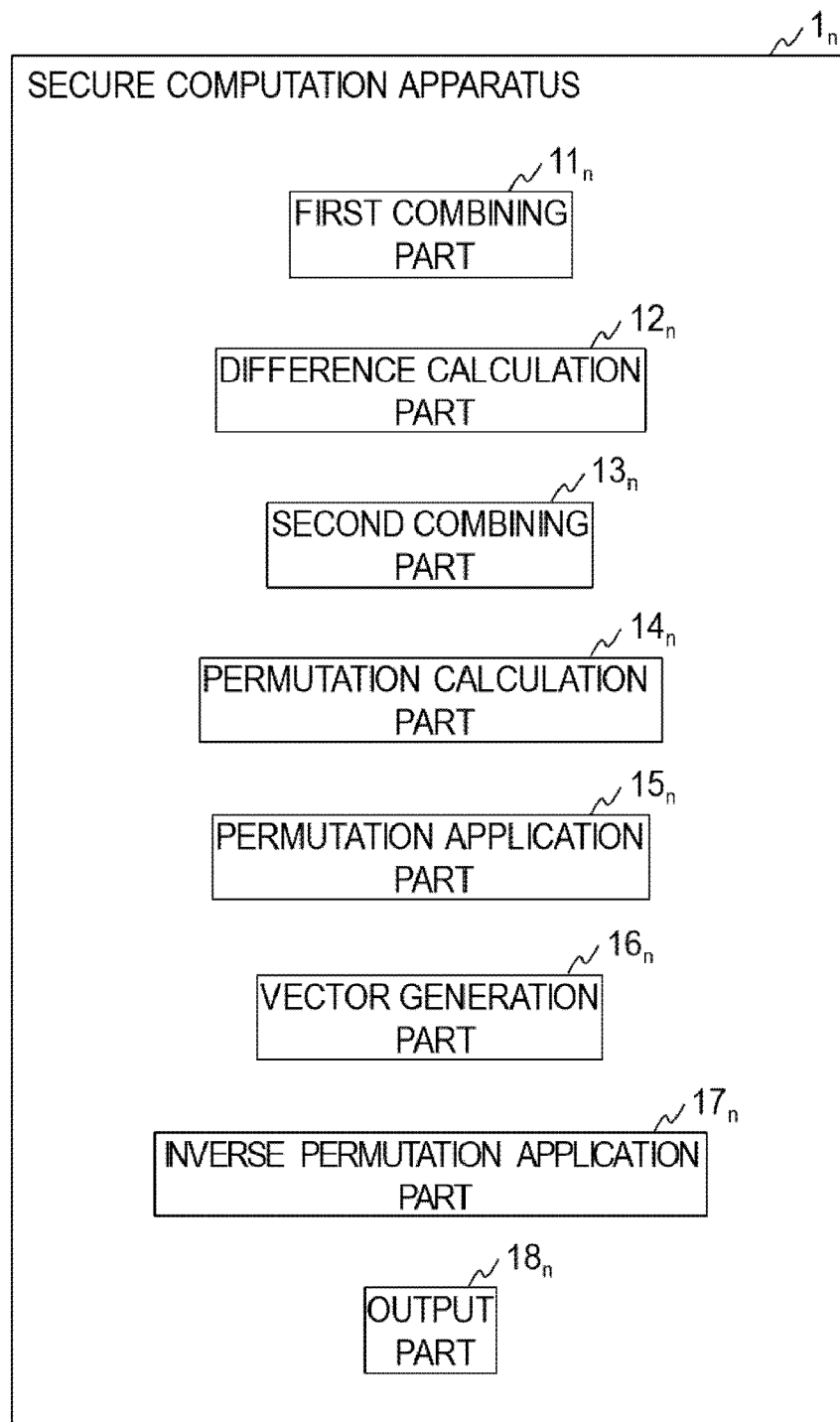
FIG. 2 is a diagram exemplifying a functional configuration of a secure computation apparatus.

A configuration example of the secure computation apparatus 1 (n=1, ..., N) included in the secure table reference system will be described with reference to FIG. 2. The secure computation apparatus $1_n$ includes, for example, a first combining part $11_n$, a difference calculation part $12_n$, a second combining part $13_n$, a permutation calculation part $14_n$, a permutation application part $15_n$, a vector generation part $16_n$, an inverse permutation application part $17_n$, and an output part $18_n$ as shown in FIG. 2. A secure table reference method of the embodiment is implemented by performing processing of each step described later while each component part of the secure computation apparatus $1_n$ (1≤n≤N) is cooperating with each component part of the other secure computation apparatuses $1_{n'}$ (n'=1, ..., N, where n≠n').

Note that processing of each step is performed by secure computation. That is, the secure computation apparatus $1_n$ performs the processing of each step without restoring a share, in other words, without knowing contents of the share.

The secure computation apparatus $1_n$ is a special apparatus in which a special program is read into a known or dedicated computer including, for example, a central processing unit (CPU) and a random access memory (RAM). The secure computation apparatus $1_n$ performs each processing, for example, under control of the central processing unit. Data input into the secure computation apparatus $1_n$ or data obtained in each processing is stored in, for example, the random access memory, and the data stored in the random access memory is read out to the central processing unit and used for other processing as needed. At least a part of each processing part of the secure computation apparatus $1_n$ may be made of hardware such as an integrated circuit.

Figure 3:
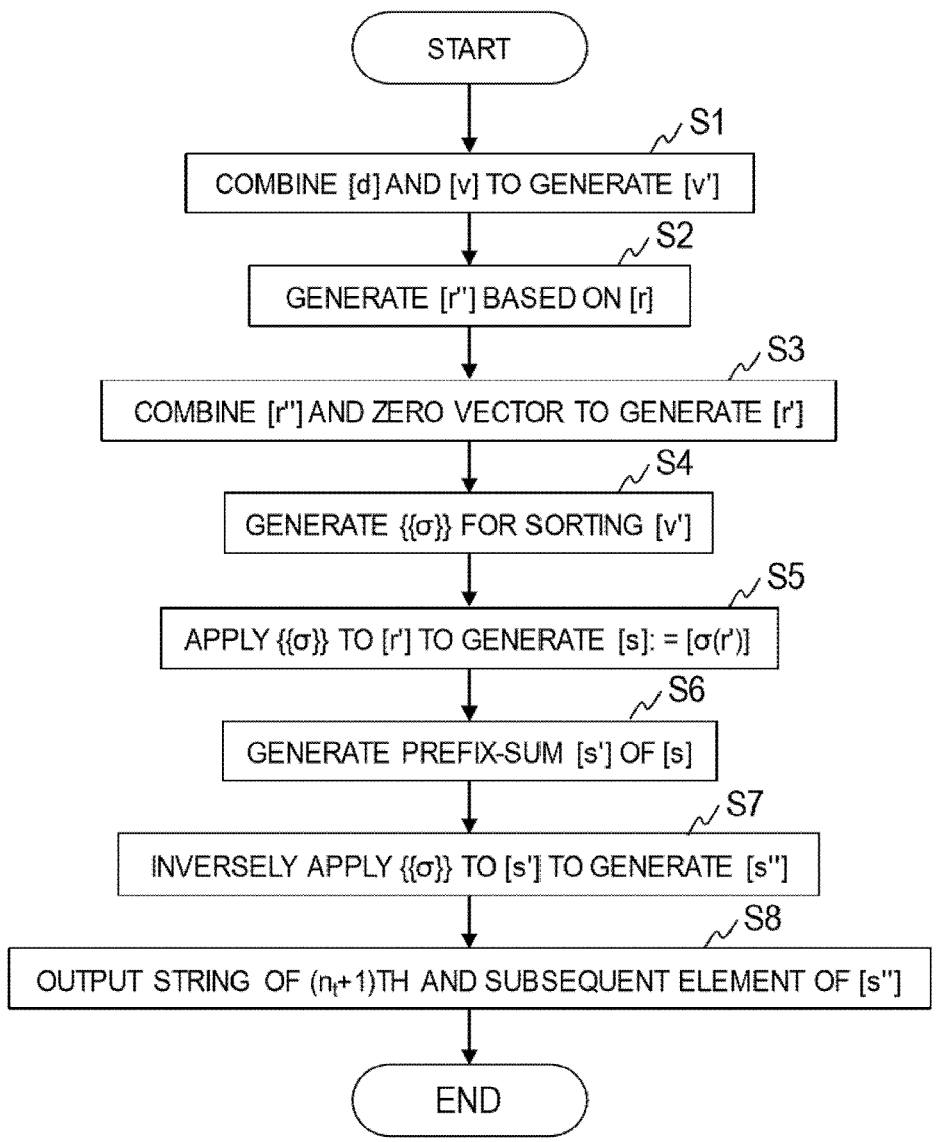
FIG. 3 is a diagram exemplifying a processing procedure of a secure table reference method.

A processing procedure of the secure table reference method executed by the secure table reference system of the embodiment will be described with reference to FIG. 3.

<Step S1>

A share [d] of a vector d and a share [v] of a vector v are input into the first combining parts $11_1, \ldots, 11_N$.

The first combining parts $11_1, \ldots, 11_N$ combine the share [d] and share [v] to generate a share $[v'] \in [F]^{m+nt}$. In more detail, the first combining parts $11_1, \ldots, 11_N$ use the share [d] and share [v] to generate the share [v'] of a vector $v' \in F^{m+nt}$ in which the vector d and vector v are combined (step S1).

The generated share [v'] is output to the permutation calculation parts $14_1, \ldots, 14_N$.

F denotes an arbitrary field, in denotes an integer greater than or equal to 2, and $n_t$ denotes an integer greater than or equal to 1. Further, v denotes an m-dimensional vector $v \in F^m$, and d denotes a vector $d \in F^{nt}$ consisting of elements of a set of input values of a prescribed lookup table. The vector v is, for example, a vector consisting of attribute values of a certain attribute in a table. Supposing α to be an arbitrary vector, [α] denotes a share where α is securely shared.

In superscript of $[F]^{m+nt}$ and $F^{nt}$, nt means "$n_t$". In this way, in the superscript, expressions of further superscript and subscript may be omitted.

For example, when a lookup table t is t: $\{0, 1, 2, 3\} \rightarrow \{1, 5, 2, 3\}$, the vector $d=(0, 1, 2, 3)^T$. At this time, when the vector $v=(1, 3, 1)^T$, the vector $v'=(0, 1, 2, 3, 1, 3, 1)^T$.

<Step S2>

A share [r] of a vector r is input into the difference calculation parts $12_1, \ldots, 12_N$.

The difference calculation parts $12_1, \ldots, 12_N$ generate a share [r"] on the basis of the share [r]. In more detail, the difference calculation parts $12_1, \ldots, 12_N$ use the share [r] to generate the share [r"] of a vector r" that has a difference between a certain element of the vector r and an element before the certain element as an element corresponding to the certain element (step S2).

The generated share [r"] is output to the second combining parts $13_1, \ldots, 13_N$.

The vector r is a vector consisting of elements of a set of output values of the lookup table.

An ith element of the vector r" is (an ith element of the vector r)-(a (i-1)th element of the vector r). However, when i=1, the ith element of the vector r" is the ith element of the vector r. That is, the first element of the vector r" is the first element of the vector r.

For example, when the lookup table t is t: $\{0, 1, 2, 3\} \rightarrow \{1, 5, 2, 3\}$, the vector $r=(1, 5, 2, 3)^T$. At this time, the vector $r"=(1, 4, -3, 1)^T$.

<Step S3>

The share [r"] is input into the second combining parts $13_1, \ldots, 13_N$.

The second combining parts $13_1, \ldots, 13_N$ combine the share [r"] and a zero vector to generate a share $[r'] \in [F]^{m+nt}$. In more detail, the second combining parts $13_1, \ldots, 13_N$ use the share [r"] to generate the share [r'] of a vector $r' \in F^{m+nt}$ in which the vector r" and m-dimensional zero vector are combined (step S3).

The generated share [r'] is output to the permutation application parts $15_1, \ldots, 15_N$.

For example, when the vector $r"=(1, 4, -3, 1)^T$ and m=3, the vector $r'=(1, 4, -3, 1, 0, 0, 0)^T$.

<Step S4>

The share [v'] is input into the permutation calculation parts $14_1, \ldots, 14_N$.

The permutation calculation parts $14_1, \ldots, 14_N$ generate $\{\{\sigma\}\}$ of the share [v']. In more detail, the permutation calculation parts $14_1, \ldots, 14_N$ use the share [v'] to generate the share $\{\{\sigma\}\}$ of a permutation σ that stably sorts the vector v' in ascending order (step S4).

The generated share $\{\{\sigma\}\}$ is output to the permutation application parts $15_1, \ldots, 15_N$.

The stable sorting means that order of equivalent data before sorting is preserved after sorting as well. Supposing β to be an arbitrary permutation, $\{\{\beta\}\}$ is a share where β is securely shared.

The generation of the sort $\{\{\sigma\}\}$ can be performed, for example, by a method described in the following Reference literature 1.

[Reference literature 1] Dai Ikarashi, Koki Hamada, Ryo Kikuchi, and Koji Chida, "An Improvement of Secure Sorting toward 1 sec. Response on Internet," 2014 Symposium on Cryptography and Information Security For example, when the vector $v'=(0, 1, 2, 3, 1, 3, 1)^T$, the permutation σ is as shown in the following Formula (1).

[Expression 1]

$$\sigma = \begin{pmatrix} 1 & 2 & 3 & 4 & 5 & 6 & 7 \\ 1 & 2 & 5 & 6 & 3 & 7 & 4 \end{pmatrix} \quad (1)$$

<Step S5>

The share [r'] and share $\{\{\sigma\}\}$ are input into the permutation application parts $15_1, \ldots, 15_N$.

The permutation application parts $15_1, \ldots, 15_N$ apply $\{\{\sigma\}\}$ to the share [r'] to generate a share [s]: $=[\sigma(r')]$. In more detail, the permutation application parts $15_1, \ldots, 15_N$ use the share [r'] and share $\{\{\sigma\}\}$ to generate the share [s] of a vector s: $=\sigma(r')$ obtained by applying the permutation σ to the vector r' (step S5).

The generated share [s] is output to the vector generation parts $16_1, \ldots, 16_N$.

The application of the permutation $\{\{\sigma\}\}$ can be performed by the method described in Reference literature 1.

For example, the vector $r'=(1, 4, -3, 1, 0, 0, 0)^T$, and when the permutation σ is a permutation shown in Formula (1), the vector $s=(1, 4, 0, 0, -3, 1, 0)^T$.

<Step S6>

The share [s] is input into the vector generation parts $16_1, \ldots, 16_N$.

The vector generation parts $16_1, \ldots, 16_N$ generate a prefix-sum [s'] of the share [s]. In more detail, the vector generation parts $16_1, \ldots, 16_N$ use the share [s] to generate the share [s'] of the vector s' that has a total sum from a first element of the vector s to a certain element as an element corresponding to the certain element (step S6).

The generated share [s'] is output to the inverse permutation application parts $17_1, \ldots, 17_N$.

For example, when the vector $s=(1, 4, 0, 0, -3, 1, 0)^T$, the vector $s'=(1, 5, 5, 5, 2, 3, 3)^T$.

<Step S7>

The share [s'] and share $\{\{\sigma\}\}$ are input into the inverse permutation application parts $17_1, \ldots, 17_N$.

The inverse permutation application parts $17_1, \ldots, 17_N$ inversely apply $\{\{\sigma\}\}$ to the share [s'] to generate a share [s"]. In more detail, the inverse permutation application parts $17_1, \ldots, 17_N$ use the share [s'] and share $\{\{\sigma\}\}$ to generate the share [s"] of the vector s" obtained by applying an inverse permutation $\sigma^{-1}$ of the permutation $\sigma$ to the vector s' (step S7).

The generated share [s"] is output to the output parts $18_1, \ldots, 18_N$.

The application of the inverse permutation $\{\{\sigma^{-1}\}\}$ can be performed, for example, by a method described in the following Reference literature 2.

[Reference literature 2] Naoto Kiribuchi, Dai Ikarashi, Gembu Morohashi, and Koki Hamada, "An Efficient Equi-join Algorithm for Secure Computation and Its Implementation toward Secure Comprehensive Analyses of Users' Attribute and History Information," Computer Security Symposium 2016

For example, when the vector $s'=(1, 5, 5, 5, 2, 3, 3)^T$ and the permutation $\sigma$ is the permutation shown in Formula (1), the vector $s''=(1, 5, 2, 3, 5, 3, 5)^T$.

Note that the application of the inverse permutation $\sigma^{-1}$ means inversely applying the permutation $\sigma$.

<Step S8>

The share [s"] is input into the output parts $18_1, \ldots, 18_N$.

The output parts $18_1, \ldots, 18_N$ output a string of $(n_r+1)$th and subsequent elements of the share [s"]. In more detail, the output parts $18_1, \ldots, 18_N$ use the share [s"] to generate a share [x] of a vector $x \in F^m$ consisting of $(n_r+1)$th and subsequent elements of the vector s" (step S8).

The generated share [x] is output as a final calculation result by the secure table reference system.

For example, when the vector $s''=(1, 5, 2, 3, 5, 3, 5)^T$ and $n_r=4$, the vector $x=(5, 3, 5)^T$.

When the lookup table t is t: $\{0, 1, 2, 3\} \rightarrow \{1, 5, 2, 3\}$ and the vector $v=(1, 3, 1)^T$, the vector $x=(5, 3, 5)^T$ is a reference result of the lookup table t with respect to the vector $v=(1, 3, 1)^T$.

In this way, it is possible to reduce communication volume compared with the prior technique by using the inverse permutation $\sigma^{-1}$.

As described above, the embodiment of the present invention has been described, but specific configurations are not limited to the embodiment, and it goes without saying that even if there is a change or the like in design as appropriate without departing from the scope of the present invention, it is included in the invention. The various processes described in the embodiment may be performed not only in chronological order according to the described order, but also in parallel or individually according to processing capability of a apparatus that performs the processes or as needed.

[Program and Recording Medium]

When various processing functions in each apparatus described in the embodiment are implemented by a computer, processing contents of functions which each apparatus should include are described by a program. Then, the computer executes the program, and thereby the various processing functions in each apparatus are implemented on the computer.

The program describing the processing contents can be recorded in a computer-readable recording medium. The computer-readable recording medium may be any recording medium, for example, a magnetic recording apparatus, an optical disk, a magneto-optical recording medium, and a semiconductor memory.

Distribution of this program is carried out, for example, by selling, transferring, or lending a portable recording medium such as a DVD or a CD-ROM on which the program is recorded. Furthermore, the program may be stored in a storage apparatus of a server computer, transferred from the server computer to another computer via a network, and thereby distributed.

A computer that executes such a program, for example, first stores the program recorded on the portable recording medium or the program transferred from the server computer temporarily in its own storage apparatus. Then, when executing processing, the computer reads the program stored in its own storage apparatus and performs the processing according to the read program. As another execution form of the program, the computer may directly read the program from the portable recording medium and perform the processing according to the program, or further may sequentially execute processing according to a received program every time the program is transferred from the server computer to the computer. In addition, the above-described processing may be performed by the so-called ASP (Application Service Provider) type service that implements a processing function only by execution instructions and result acquisition, without transferring the program from the server computer to the computer. Note that the program in the embodiment includes information which is used for processing by the computer and is similar to the program (data or the like that is not a direct command to the computer but has properties that define processing of the computer).

In the embodiment, the apparatus is configured by executing the predetermined program on the computer, but at least a part of the processing contents may be implemented by hardware.

DESCRIPTION OF REFERENCE NUMERALS $1_1, \ldots, 1_N$ Secure computation apparatus
$11_1, \ldots, 11_N$ First combining part
$12_1, \ldots, 12_N$ Difference calculation part
$13_1, \ldots, 13_N$ Second combining part
$14_1, \ldots, 14_N$ Permutation calculation part
$15_1, \ldots, 15_N$ Permutation application part
$16_1, \ldots, 16_N$ Vector generation part
$17_1, \ldots, 17_N$ Inverse permutation application part
$18_1, \ldots, 18_N$ Output part
2 Communication network

What is claimed is:

1. A secure table reference system, comprising a plurality of secure computation apparatuses, wherein
assuming that F denotes an arbitrary field, m denotes an integer greater than or equal to 2, $n_r$ denotes an integer greater than or equal to 1, [α] denotes a share where α is securely shared supposing α to be an arbitrary vector, $\{\{\beta\}\}$ denotes a share where β is securely shared supposing β to be an arbitrary permutation, v denotes an m-dimensional vector $v \in F^m$, d denotes a vector d $\in F^{n_r}$ consisting of elements of a set of input values of a prescribed lookup table, and r denotes a vector consisting of elements of a set of output values of the lookup table, the plurality of secure computation apparatuses include processing circuitry configured to implement:
- a plurality of first combining parts for generating a share [v'] of a vector v' ∈ $F^{m+n_t}$ in which the vector d and the vector v are combined using a share [d] of the vector d and a share [v] of the vector v, wherein each of the plurality of secure computation apparatuses communicate over a network and receive as an input the share [d] and the share [v] while the vector d and the vector v remain concealed from each of the plurality of secure computation apparatuses;
- a plurality of difference calculation parts for generating a share [r''] of a vector r'' that has a difference between a certain element of the vector r and an element before the certain element as an element corresponding to the certain element using a share [r] of the vector r;
- a plurality of second combining parts for generating a share [r'] of a vector r' ∈ $F^{m+n_t}$ in which the vector r'' and an m-dimensional zero vector are combined using the share [r''];
- a plurality of permutation calculation parts for generating a share {{σ}} of a permutation σ that stably sorts the vector v' in ascending order using the share [v'];
- a plurality of permutation application parts for generating a share [s] of a vector s: =σ(r') obtained by applying the permutation c to the vector r' using the share [r'] and the share {{σ}};
- a plurality of vector generation parts for generating a share [s'] of a vector s' that has a total sum from a first element of the vector s to a certain element as an element corresponding to the certain element using the share [s];
- a plurality of inverse permutation application parts for generating a share [s''] of a vector s'' obtained by applying an inverse permutation $σ^{-1}$ of the permutation σ to the vector s' using the share [s'] and the share {{σ}}; and
- a plurality of output parts for generating a share [x] of a vector x ∈ $F^m$ consisting of ($n_t$+1)th and subsequent elements of the vector s'' using the share [s''], the vector x being the final calculation result and being concealed from each of the plurality of secure computation apparatuses.

2. A secure computation apparatus of the secure table reference system according to claim 1.

3. A non-transitory computer-readable medium that stores a program for causing a computer to function as component parts of one of the secure computation apparatuses according to claim 1.

4. A secure table reference method implemented by a secure table reference system comprising a plurality of secure computation apparatuses, wherein assuming that F denotes an arbitrary field, m denotes an integer of two or more, $n_t$ denotes an integer of one or more, [α] denotes a share where cc is securely shared supposing α to be an arbitrary vector, {{β}} denotes a share where β is securely shared supposing β to be an arbitrary permutation, v denotes an m-dimensional vector v ∈ $F^m$, d denotes a vector d ∈ $F^{n_t}$ consisting of elements of a set of input values of a prescribed lookup table, and r denotes a vector consisting of elements of a set of output values of the lookup table, the method comprises, by processing circuitry of the plurality of secure computation apparatuses:
- a first combining step in which a first combining part generates a share [v'] of a vector v' ∈ $F^{m+n_t}$ in which the vector d and the vector v are combined using a share [d] of the vector d and a share [v] of the vector v, wherein each of the plurality of secure computation apparatuses communicate over a network and receive as an input the share [d] and the share [v] while the vector d and the vector v remain concealed from each of the plurality of secure computation apparatuses;
- a difference calculation step in which a difference calculation part generates a share [r''] of a vector r'' that has a difference between a certain element of the vector r and an element before the certain element as an element corresponding to the certain element using a share [r] of the vector r;
- a second combining step in which a second combining part generates a share [r'] of a vector r' ∈ $F^{m+n_t}$ in which the vector r'' and an m-dimensional zero vector are combined using the share [r''];
- a permutation calculation step in which a permutation calculation part generates a share {{σ}} of a permutation σ that stably sorts the vector v' in ascending order using the share [v'];
- a permutation application step in which a permutation application part generates a share [s] of a vector s: =σ(r') obtained by applying the permutation σ to the vector r' using the share [r'] and the share {{σ}};
- a vector generation step in which a vector generation part generates a share [s'] of a vector s' that has a total sum from a first element of the vector s to a certain element as an element corresponding to the certain element using the share [s];
- an inverse permutation application step in which an inverse permutation application part generates a share [s''] of a vector s'' obtained by applying an inverse permutation $σ^{-1}$ of the permutation σ to the vector s' using the share [s'] and the share {{σ}}; and
- an output step in which an output part generates a share [x] of a vector x ∈ $F^m$ consisting of ($n_t$+1)th and subsequent elements of the vector s'' using the share [s''] ], the vector x being the final calculation result and being concealed from each of the plurality of secure computation apparatuses.

* * * * *